United States Patent [19]
Baker et al.

[11] Patent Number: 5,278,972
[45] Date of Patent: Jan. 11, 1994

[54] COMMUNICATION SYSTEM FOR CONVERTING ISDN SIGNALING PROTOCOL BETWEEN LOCAL AND PUBLIC NETWORK HAVING FIRST GROUP OF MANDATORY ELEMENTS AND SECOND GROUP OF NON-MANDATORY ELEMENTS

[75] Inventors: Albert D. Baker, Lincroft; Wayne D. Farmer, Matawan; Richard E. Henderson, Marlboro; Thomas C. Prewitt, Holmdel; Mary E. Ricker, Hazlet; David B. Rucinski; Albert V. Toy, both of Middletown, all of N.J.; Jerry S. Weltman, Dallas, Tex.

[73] Assignee: AT&T Bell Laboratories, Murray Hill, N.J.

[21] Appl. No.: 616,961

[22] Filed: Nov. 21, 1990

[51] Int. Cl.$^5$ .................. G06F 13/00; G06F 3/00
[52] U.S. Cl. ............................... 395/500; 395/200; 364/240.8; 364/260; 364/260.1; 364/260.4; 364/260.9; 364/261.1; 364/DIG. 1; 364/940.81
[58] Field of Search ............... 395/500, 275, 200, 800; 379/39, 88

[56] References Cited

U.S. PATENT DOCUMENTS

| | | | |
|---|---|---|---|
| 3,930,232 | 12/1975 | Wallach et al. | 395/500 |
| 4,485,439 | 11/1984 | Rothstein | 395/500 |
| 4,513,373 | 4/1985 | Sheets | 395/275 |
| 4,580,240 | 4/1986 | Watanabe | 364/900 |
| 4,602,331 | 7/1986 | Sheth | 395/250 |
| 4,688,170 | 8/1987 | Waite et al. et al. | 395/500 |
| 4,875,186 | 10/1989 | Blume, Jr. | 395/500 |
| 4,965,771 | 10/1990 | Morikawa et al. | 395/275 |
| 4,970,721 | 11/1990 | Aczel et al. | 370/92 |
| 4,999,771 | 3/1991 | Ralph et al. | 364/200 |
| 5,063,494 | 11/1991 | Davidowski et al. | 395/800 |
| 5,134,644 | 7/1992 | Garton et al. | 379/39 |
| 5,164,981 | 11/1992 | Mitchell et al. | 379/88 |

OTHER PUBLICATIONS

J. J. Brown et al, "A Subset of the ISDN Network Layer Protocol Suitable for Implementation in Hardware" Proceedings, The Seventh Annual Joint Conference of the IEEE Computer and Communications Societies, Mar. 27-31, 1988, pp. 1065-1071, New Orleans, U.S. XP14462.

G. M. J. Havermans et al "ISPBX Evolution Towards Standard ISDN" Philips Telecommunication Review, vol. 48, No. 3, Sep. 1990, Hilversum NL, pp. 24-32.

Lin, Tzunk-Pao, "A Multi-Function ISDN Home Communication System" IEEE Transactions on Consumer Electronics, New York US.

Chow, Ching-Hua, "Protocol Issues in Interconnection ISDN, IN, and LAN" Proceedings, IEEE Region 10 Conference on Computer and Communication Systems, Sep. 24-27, 1990, vol. 2, pp. 610-616, XP235947.

Primary Examiner—Thomas C. Lee
Assistant Examiner—Meng-Ai Tan
Attorney, Agent, or Firm—John A. Caccuro

[57] ABSTRACT

A communication system operates compatibly with a public or private switching network using a Q.931 protocol for basic rate ISDN communications. Communications between a control unit and station terminals of the system use a local protocol which is a modification of the Q.931 protocol. This local protocol includes one segment including the mandatory elements of the Q.931 protocol and a second segment derived by converting the optional elements of the Q.931 protocol into a local codeset which controls the user interface circuits at each station terminal. The local protocol enables call control between the control unit and each station terminal to be managed on a bearer channel basis while call control between the system and the network is managed on a call appearance basis using the standard Q.931 protocol. The local protocol provides for communicating line selection and feature activation commands from the terminal to the control unit, using simple button commands.

26 Claims, 6 Drawing Sheets

CONTROL UNIT MAINTAINED TERMINAL DATA TABLE 600

| | LINE TO STATION ASSIGNMENT | | STATION BUTTON/ LED CELL MAP | TERMINAL TYPE |
|---|---|---|---|---|
| | 610 | 620 | 630 | 640 |
| FEATURE ID | DN | TERMINAL ID | BUTTON/LED CELL NUMBER | TERMINAL TYPE |
| | 957 0000 | 1 | 1 | NT2 |
| | | 2 | 1 | NT2 |
| | | 3 | 2 | NT2 |
| | | 4 | 3 | NT2 |
| | ↓ | 5 | | Q.931 |
| | 957 0001 | 1 | 3 | NT2 |
| | ↓ | 2 | 3 | NT2 |
| | 957 0002 | 1 | 2 | NT2 |
| | | 2 | 2 | NT2 |
| | ↓ | 3 | 1 | NT2 |
| | 957 0003 | 4 | 2 | NT2 |
| HOLD | | 1 | 4 | NT2 |
| TRANSFER | | 1 | 5 | NT2 |
| CONFERENCE | | 2 | 4 | NT2 |

FIG. 7

TERMINAL MAINTAINED TABLE

| | INFORMATION ELEMENT TYPE | INFORMATION ELEMENT CONTENTS | |
|---|---|---|---|
| FROM CU | LED | CELL ID, FLASH PATTERN | 701 |
| | ALERT | TONE PATTERN | 702 |
| | DISPLAY | CURSOR COMMANDS AND ASCII TEXT STRINGS | 703 |
| TO CU | BUTTON | BUTTON ID | 704 |

FIG. 9

900 — Q.931 PROTOCOL METHOD FOR MANAGING CALL APPEARANCES FOR CALL CONTROL

| CALL APPEARANCE/DN | CALL STATE | CRV |
|---|---|---|
| 201 957 0000 | IDLE | 1 |
| 201 957 0001 | IDLE | 2 |
| 201 957 0002 | ACTIVE | 3 |
| 201 957 0003 | IDLE | 4 |
| 201 957 0004 | HOLD | 5 |
| 201 957 0005 | ALERTING | 6 |
| 201 957 0006 | HOLD | 7 |
| 201 957 0007 | IDLE | 8 |
| 201 957 0008 | IDLE | 9 |
| 201 957 0009 | HOLD | 11 |
| 201 957 0010 | IDLE | 12 |
| 201 957 0011 | IDLE | 13 |
| 201 957 0012 | IDLE | 14 |
| 201 957 0013 | IDLE | 15 |
| 201 957 0014 | IDLE | 16 |
| 201 957 0015 | IDLE | 17 |
| 201 957 0016 | IDLE | 18 |
| 201 957 0017 | IDLE | 19 |
| 201 957 0018 | IDLE | 21 |
| 201 957 0019 | IDLE | 22 |
| 201 957 0020 | IDLE | 23 |
| 201 957 0021 | HOLD | 24 |
| 201 957 0022 | HOLD | 25 |
| 201 957 0023 | HOLD | 26 |
| 201 957 0024 | HOLD | 27 |

910 — NT2 METHOD FOR MANAGING BEARER CHANNELS FOR CALL CONTROL

| BEARER CHANNEL | CALL STATE | CRV |
|---|---|---|
| CHANNEL 1 | ACTIVE | 1 |
| CHANNEL 2 | IDLE | 2 |

NOTE: DN = DIRECTORY NUMBER, CALL APPEARANCES MAY HAVE A UNIQUE DN, OR MAY SHARE 1 DN PER INTERFACE. IN THE LATTER CASE, TERMINAL MUST USE ADDITIONAL INFORMATION, PERHAPS CHANNEL ID, TO ENSURE PROPER CALL APPEARANCE MANAGEMENT.

| | CONTROL UNIT | TERMINAL |
|---|---|---|
| 1011 CALL ESTABLISHMENT MESSAGES | | |
| ALERTING | 1005 | |
| CALL PROCEEDING | 1004 | |
| CONNECT | 1006 | |
| CONNECT ACKNOWLEDGE | | |
| PROGESS | | |
| SETUP | | 1001 |
| SETUP ACKNOWLEDGE | 1002 | |
| 1012 CALL INFORMATION PHASE MESSAGE: USER INFORMATION | | |
| 1013 CALL CLEARING MESSAGES | | |
| DISCONNECT | | 1007 |
| RELEASE | 1008 | |
| RELEASE COMPLETE | | 1009 |
| 1014 MISCELLANEOUS MESSAGES STATUS INQUIRY | | |
| INFORMATION | | 1003 |
| STATUS | | |

COMMUNICATION SYSTEM FOR CONVERTING ISDN SIGNALING PROTOCOL BETWEEN LOCAL AND PUBLIC NETWORK HAVING FIRST GROUP OF MANDATORY ELEMENTS AND SECOND GROUP OF NON-MANDATORY ELEMENTS

TECHNICAL FIELD

This invention relates to communication systems and, more particularly, to a communication system which operates over ISDN facilities.

BACKGROUND OF THE INVENTION

The Q.931 protocol has been accepted as the standard for ISDN signaling channel communications over a central office loop to a subscriber location. In such an arrangement, a terminal at the subscriber's location generates user interface information (e.g., which features and buttons are used at the terminal) from call control information sent using the Q.931 protocol. Each terminal requires a relatively powerful processor, a collection of special sophisticated algorithms, a large random-access-memory (RAM) and a large read-only-memory (ROM) to generate the user interface information. Additionally, this call control complexity increases proportionally with the number of line buttons on a station terminal. Unfortunately, these additional capabilities add significantly to the cost of station terminals. Moreover, to upgrade or add a feature to the terminals may require that changes be made to each terminal which adds significant terminal upgrade costs; since changes to the administrative data must be performed on a per terminal basis thereat.

What is desirable is a way to reduce terminal production cost and customer upgrade cost of the terminals while maintaining their compatibility with the Q.931 protocol standard.

SUMMARY OF THE INVENTION

In accordance with the present invention, a communication system uses a Q.931 protocol for basic rate ISDN communications with a public or a private switching network and uses a novel local protocol (NT2), a modified Q.931 protocol, for controlling communications between NT2 or Q.931-compatible station terminals and the control unit of the system. The NT2 local protocol enables call control between the control unit and station terminals to be managed on a bearer channel basis while network call control is managed on a call appearance or directory number basis. This reduces the cost of the user interface intensive voice terminals while still supporting network standard data devices.

According to a feature of the present invention, the control unit processes or converts the Q.931 protocol message to a first group of information elements containing all mandatory Q.931 protocol message elements and a second group of information elements containing non-mandatory Q.931 protocol message elements. The second group of elements controls the operation of user-interface devices (e.g., LED, display, alerter) at a station terminal. The first group of elements is used to establish a call connection between the control unit and any NT2 or Q.931-compatible station terminal.

According to another aspect of the present invention, the control unit manages call control on a call appearance basis and converts call control information received over an external channel to a local protocol message having bearer channel format for communicating with a station terminal. The station terminal uses the local protocol message to control facility acquisition and to control user-interface devices. Another aspect of the present invention enables the system to identify station terminal types and to communicate NT2 protocol messages to NT2 station terminals and to communicate Q.931 protocol messages, including the optional elements, to Q.931 station terminals.

By managing network-to-control unit call control on a call appearance basis at the control unit, and managing control-unit-to terminal call control on a bearer channel basis, the processing and, therefore, the complexity of each terminal is dramatically reduced. Moreover, because call control and administrative data stores are handled on a centralized basis, essentially only the control unit of the system need be updated when features or facilities are added or changed in the system, or the system itself is upgraded, updated or reconfigured.

BRIEF DESCRIPTION OF THE DRAWING

In the drawing.

FIG. 7 illustrates a terminal-maintained user interface table;

FIG. 9 shows a comparison of the Q.931 protocol method of managing call appearances, call control and the NT2 protocol method of managing bearer channels for control.

GENERAL DESCRIPTION

In the following description, elements of each figure have reference designations associated therewith, the most significant digit of which refers to the figure in which that element is located (e.g., 100 is located in FIG. 1).

Figure 1:
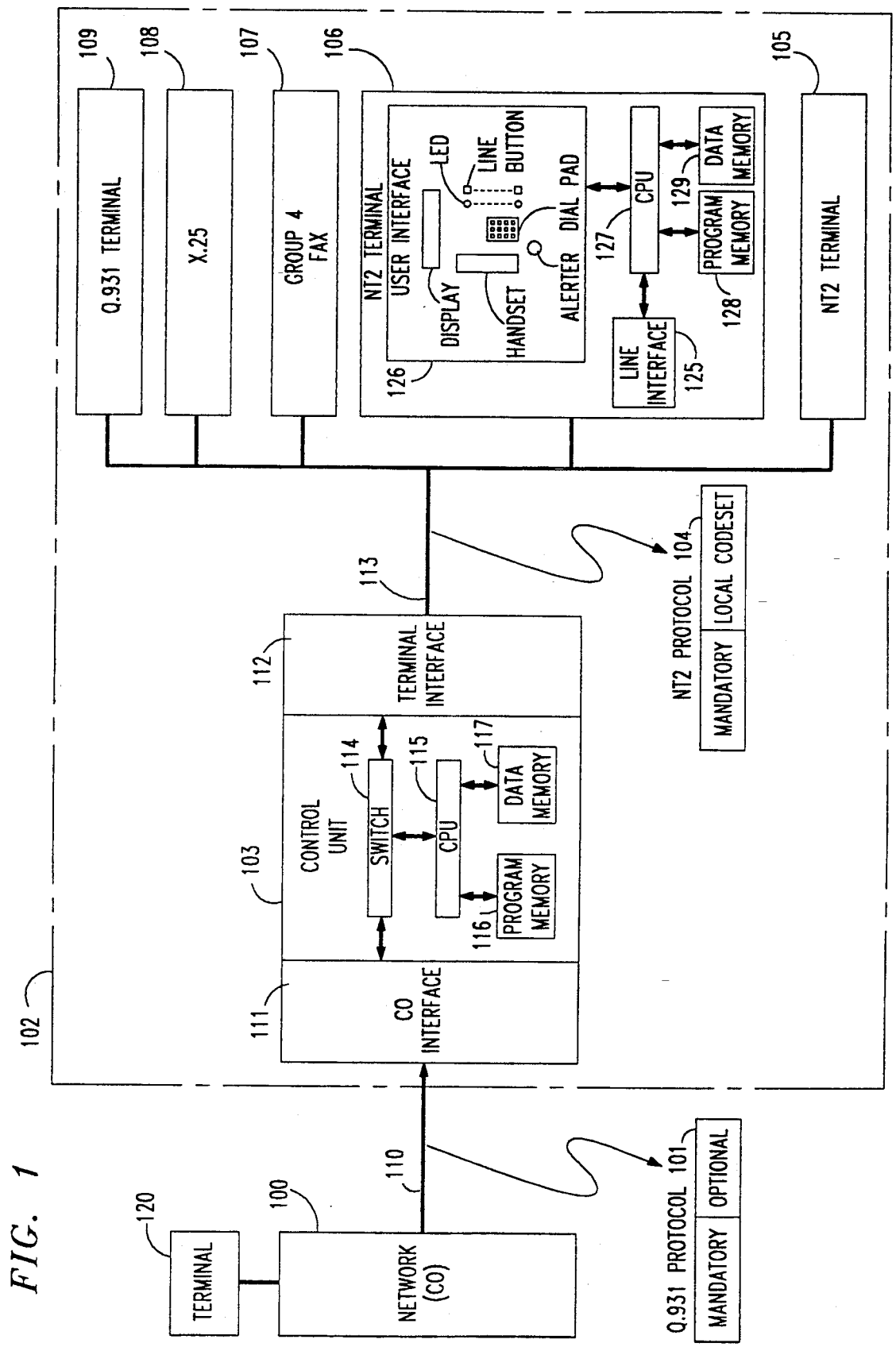
FIG. 1 is a block diagram of a communication system embodying the present invention.

Shown in FIG. 1 is an illustrative block diagram of a communication system 102 useful in describing the operation of the present invention. The system might typically be installed on the premises of a small business. The system includes Common Control Module or unit 100 which connects to one or more Switching Network (e.g., Central Office (CO)) lines 110 via Interface 111, and which connects via Interface 112 and one or more facilities 113 to, illustratively, one or more NT2-compatible terminals such as 105-106, Group 4 (G4) Fax Machine 107, X.25 Terminal 108 and a Q.931-compatible terminal 109. Facilities 113 may be, for example, a point-to-point facility (not shown) or a multipoint passive bus, as shown in FIG. 1.

The general operation of the communication system shown in FIG. 1 is as follows. Control unit 103 establishes and controls all intercom and network communications. Control unit 103 includes Switch 114, Central Processor Unit (CPU) 115, Program Memory 116 and Data Memory 117. Program Memory 116 provides instructions to CPU 115 for controlling Switch 114 and Interface Units 111 and 112 to enable the various operating features and functions of the system including those of the present invention. Data Memory 117 is utilized by CPU 115 for storing and accessing data associated with performing the various functions and features programmed in Program Memory 116. In a preferred embodiment CPU 115 is a microprocessor, Program Memory 116 is read-only-memory (ROM) and Data Memory 117 is random access memory (RAM). The Interface Circuits 111 and 112 may include well known circuitry such as ring detector, switching matrix, network control, line circuits and other circuitry required by the system to establish, maintain and terminate communications.

Each terminal e.g., 106, may, illustratively, be represented as including Line Interface 125, User Interface 126, a processor (CPU) 127, Program Memory 128 and Data Memory 129. Line Interface 125 includes the circuitry required to enable communications over facility 113. User interface representatively includes the handset, display dial pad, line and feature buttons, associated LED indicators, audio alerter and other well-known circuitry required to provide telephone communication at a terminal. The CPU 127 operates vendor program control using instructions stored in Program Memory 128 and data stored in Data Memory 129 which enables the terminal to provide the various communication features and functions, including those of the present invention.

The communication system 102 shown in FIG. 1 is designed to provide basic rate ISDN communications with a Switching Network 100 (illustratively also referred to hereinafter as a Central Office (CO)) using the Q.931 protocol. The ISDN Basic Rate Interface is typically two 64 Kbps bearer channels, known as the "B" channels, and one 16 Kbps signaling channel, also known as the "D" channel. Like the Q.931 standard signaling protocol, the NT2 protocol described herein also applies to the D channel. The Q.931 protocol is defined by "The International Telegraph and Telephone Consultative Committee, Digital Subscriber Signalling System Number 1, Network Layer, Recommendation Q.931, Geneva, 1989." The Q.931 protocol defines the standard method for handling multiple call appearances on a voice terminal (e.g., 120) connected directly to the network 100. The Q.931 protocol handles multiple call appearances by managing one state machine for each call appearance (i.e., each Directory Number DN) at terminal 120. This typically requires that terminal 120 maintain a state machine and call record for each call appearance supported, and update a data instance (i.e., change in status) for each call offered and/or awarded to terminal 120.

The user interface for call appearance (or line) information is controlled by the terminal's processor and presents the user with a call-state-related-user interface condition (e.g., tone and or illumination) as determined by a complex call evaluation algorithm. This call-related-user-interface information is derived from stored data instance information associated with each call appearance which is stored at terminal 120, and requires that terminal 120 maintain a complex evaluative algorithm to evaluate and update both the call control state machine and the user interface on the basis of both network and user input. Note that every Q.931 protocol-compatible terminal which connects to network 100 must contain the complex evaluative algorithm. Thus, each terminal 120 requires a relatively powerful processor to process this complex evaluative algorithm. Moreover, when a new feature is changed or added at a terminal, this algorithm may need to be changed.

In accordance with the present invention, control unit 103 of communication system 102 provides Q.931 protocol-based ISDN communications 101 with network 100 and provides centralized call control management on a network call appearance basis for all terminals 105, 106 of the system. Control unit 103 processes or converts the Q.931 protocol information 101 and uses a novel modified Q.931 protocol, referred to hereinafter as the NT2 local protocol 104, to provide user interface communications with, and to simplify the call control interface to, Voice Terminals 105 and 106.

The NT2 protocol 104 is Q.931 compliant, where Q.931 compliant is defined as supporting, at a minimum, all messages used for call establishment and supporting all mandatory information elements associated with those messages. This architecture allows a reduction in the number of state machines needed at a terminal by managing bearer channel connection instances (i.e., maximum active call appearances=two for a basic rate ISDN channel) to the terminal rather than managing call appearances (equal to the number of incoming lines or directory numbers handled by the system). Thus, the user interface control, is separated from call control and both are performed by control unit 103.

The control unit 103 maintains data defining the current call and user interface states for all terminals that it serves. As new information is received from the network, (or as information is generated by activity initiated at other terminals behind the control unit), the control unit re-evaluates the user interface conditions at all terminals logically related to that activity. This re-evaluation equates to an update of the appropriate control unit data tables, and execution of the algorithms of FIGS. 4 and 5. This architecture enables control unit 103 to send user interface commands to control call appearance information at the terminal, thereby eliminating the need for the terminal to perform algorithmic evaluation of call appearance information. Moreover, since there are a maximum of two bearer channels on a basic rate ISDN channel, each terminal need manage only a maximum of two state machines, independent of the number of call appearances that appear on the terminal.

FIG. 9 compares prior art Q.931 protocol call appearance management 900 at terminal 120 with our NT2 method of bearer channel user interface management 910 at a system 102 terminal (e.g., 105). According to our invention, the Q.931 protocol call appearance management 900, which in prior art arrangements takes place at each system terminal, now takes place only at control unit 103, while the more simplified NT2 protocol bearer channel management 910 takes place at the system terminals 105 and 106. Thus, control unit 103 receives information in a Q.931 protocol format, performs all user interface algorithm execution on a call appearance basis 900 for all of its attached terminals, converts the Q.931 information into an NT2 protocol format, and offers the results to terminals 105 and 106 on a bearer channel basis 910.

Figures 5, 6:
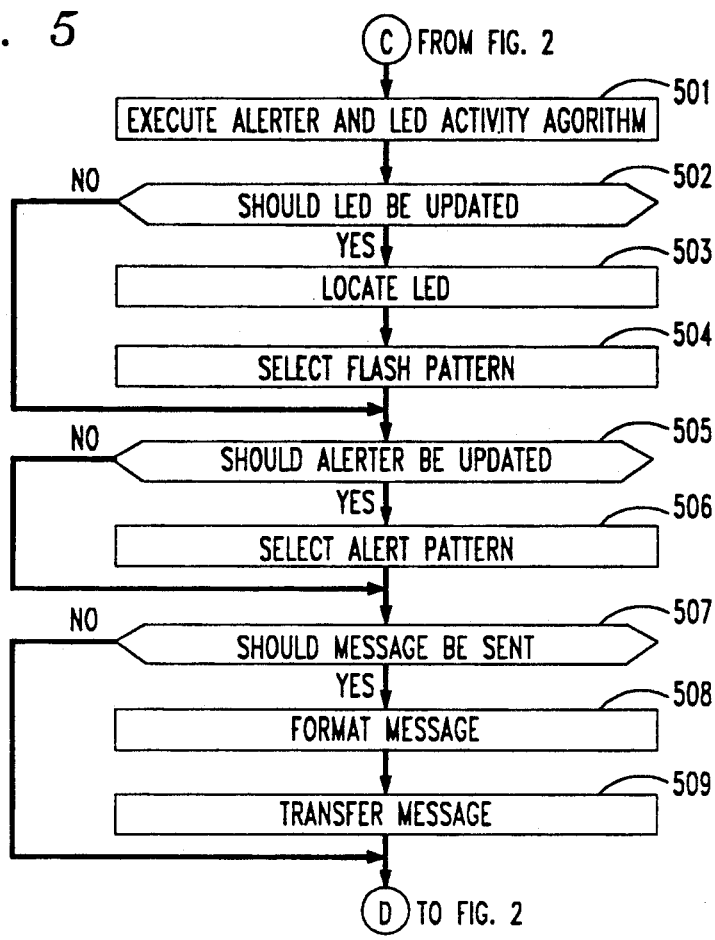
FIG. 5 is a flow chart describing the operation of an Alerter/LED management routine executed in the control unit.
FIG. 6 illustrates a table indicating line-to-station assignments, station button/LED call mapping and station terminal type.

Note that control unit 103 determines, using column 640 of FIG. 6, that the terminal identified by the DN (e.g., 109) is Q.931 type, not an NT2 type and the Information Elements of message 101 are retransmitted to the terminal 109 without alteration. This allows support of network standand (e.g., Q.931) terminals on the same bus 113.

The Q.931 SETUP message Information Elements (311, 313-317, 321) from the network are converted to the NT2 protocol elements 318-383 through a series of table lookups and evaluative processing. FIG. 5 outlines this process for the LEDs and Alerting device, and FIG. 4 similarly outlines the process for the Display. Control unit 103 sends user interface results to the terminals as a series of simple stimulus commands which control known hardware entities in the terminals 105 and 106. In comparison, every instance of prior art terminal 120 will contain the user interface algorithms and a call control state machine data instance for every call appearance or directory number assigned to it. As a result, terminals 105 and 106 are much less complex, but provide, in combination with control unit 103, at least the same level of functionality as prior art terminal 120.

Figure 3:
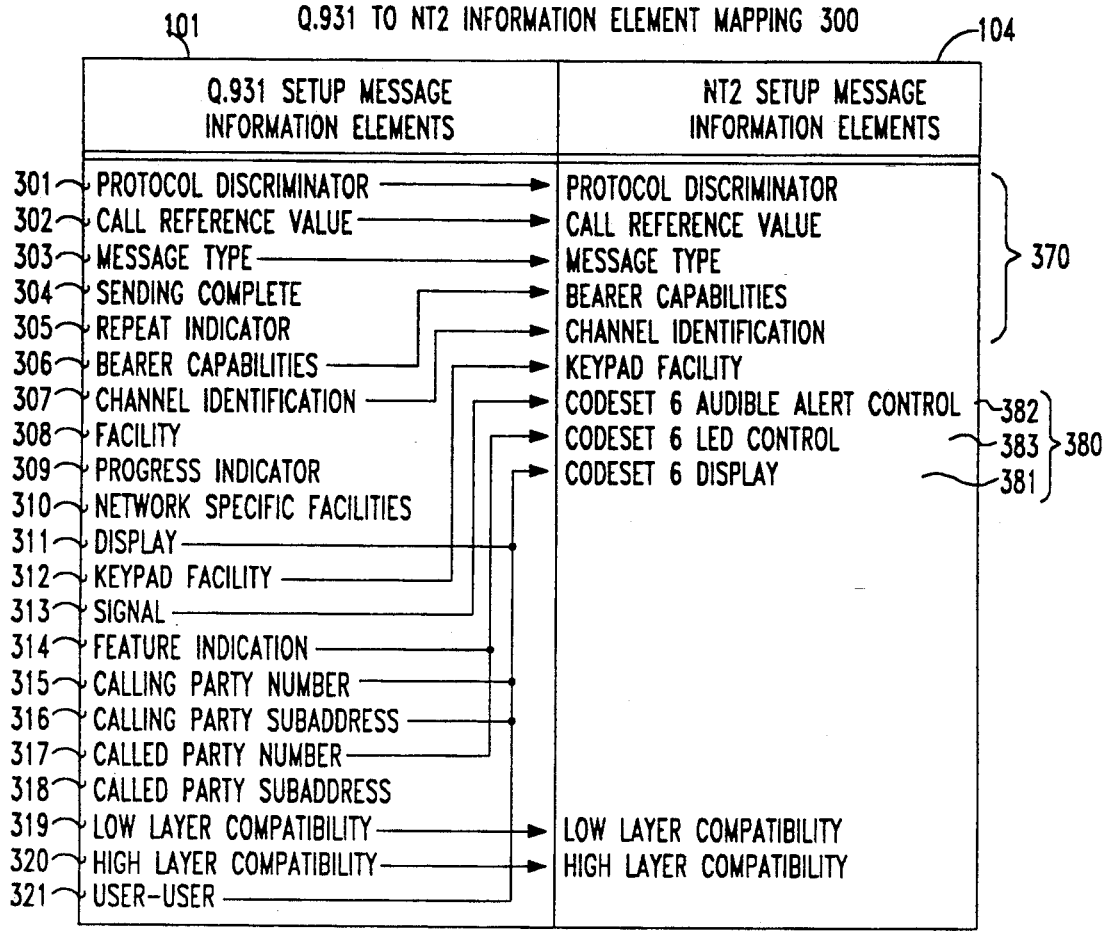
FIG. 3 illustrates converting of the Q.931 protocol SETUP message to the NT2 protocol SETUP message.

With reference to FIG. 3 we compare the Q.931 protocol to our novel NT2 protocol. For communications between control unit 103 and terminals 105 and 106, the NT2 protocol 104 provides more flexibility than the Q.931 protocol 101, while conforming to the mandatory components of that reference standard. The mandatory components of Q.931 include the messages, message sequence, message contents and state machine behavior. The NT2 protocol, in accordance with the present invention, is intended for use at the "S" reference point in the ISDN model, and reflects the architectural differences between a central office and a customer premises switch. The benefits of this NT2 protocol architecture include:

1. providing multiline capability with a reduced number of state machines required at each terminal, resulting in reduced terminal complexity.
2. separating the user interface from the call control machine (control unit 103), thereby providing additional flexibility in call information to the user and reduced terminal complexity. In addition, the terminal need only support one method (Button ID) for communicating line selection and feature invocation.

Before proceeding with the detailed operating description of the present invention, it should be recognized that the present invention may be utilized in a variety of other telephone communication systems. Since such systems utilize a variety of hardware and programming techniques, no attempt is made to describe the hardware and programs used to control the communication system. However, the present invention must be incorporated into the overall structure of the system in which it is used and should be tailored to mesh with other features and operations of the system. Thus, in order to avoid confusion and in order to enable those skilled in the art to practice the claimed invention, this specification will describe the operation of the present invention using the system block diagram of FIG. 1, the flow charts of FIGS. 2, 4, 5 and 8 and tables of FIGS., 6, 7 and 9.

DETAILED DESCRIPTION

Figures 8, 10:
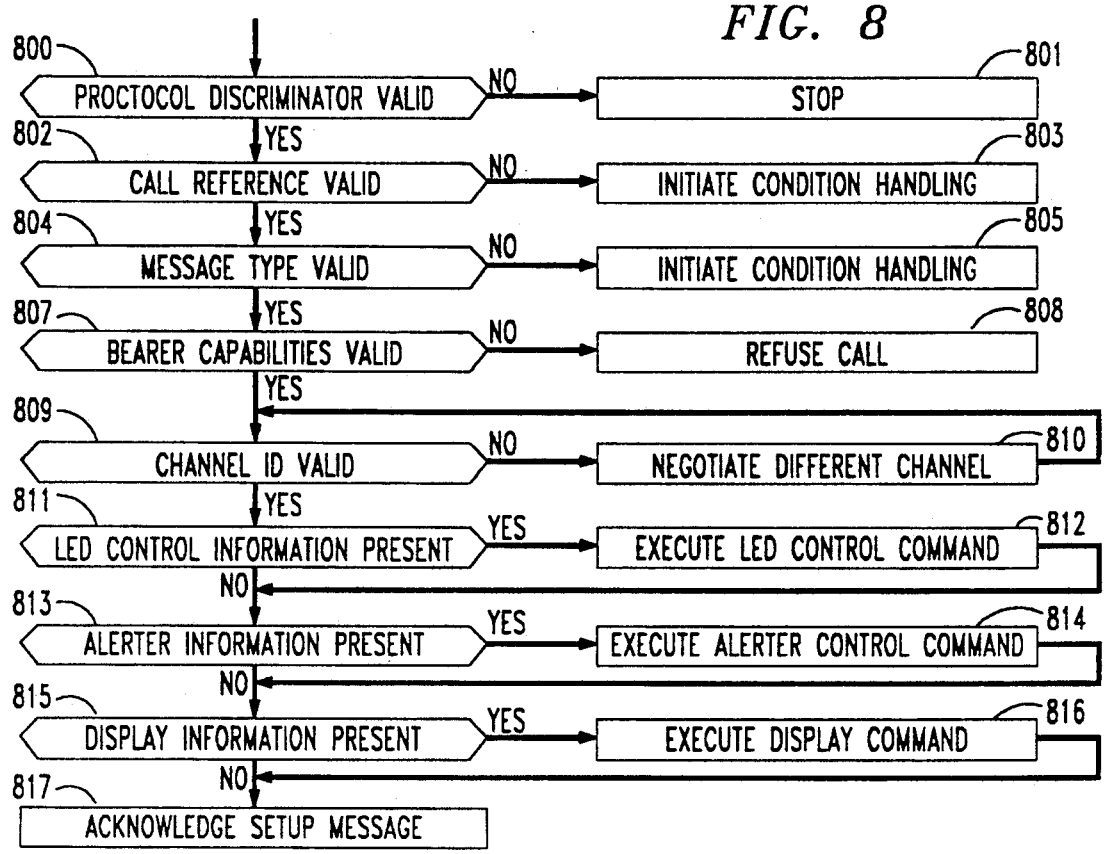
FIG. 8 is a flow chart describing the operation of terminal in response to NT2 protocol communication.
FIG. 10 shows the various groups of Q.931 protocol messages used to control communication connections.

With reference to FIG. 10, basic rate ISDN communication uses Q.931 protocol messages divided into four groups including Call Establishment Messages 1011, Call Information Messages 1012, Call Clearing Messages 1013, and Miscellaneous Messages 1014. Each group includes one or more messages, e.g., the Call Establishment Message group includes a SETUP message described in detail herein. The SETUP message is described herein because it is the most complicated in that it contains most of the information elements used in the Q.931 protocol, as shown by 301-321 of FIG. 3. The other messages of the different message classes use fewer information elements than shown by 301-321 of FIG. 3. More importantly, the SETUP message contains all the optional, or non-mandatory, elements (311-317, 321) which are processed by the present invention into the Codeset 6 message set as described herein. Thus, the operation of the present invention during the communication of other than the SETUP messages proceeds in a consistent fashion with equivalent processing of the Q.931 optional information elements (311-317, 321).

Shown in FIG. 10 is an illustrative call establishment interaction between the control unit 103 and terminal 106 for a call initiated by terminal 106. This illustrative call setup basically describes the well-known Q.931 call setup procedure, including the call establishment 1011, call information phase 1012, call clearing 1013, and miscellaneous 1014 messages. Terminal 106 goes off-hook and sends a SETUP message 1001 and control unit 103 responds with a SETUP ACKNOWLEDGE message 1002. The terminal 106 sends the remaining digits in INFORMATION messages 1003. When all digits are received, control unit sends CALL PROCEEDING 1004, ALERTING 1005 and then CONNECT 1006 to terminal 106. At this point, the call is cut-through and the user can communicate to the far end. When the user at terminal 106 hangs-up, a DISCONNECT message 1007 is sent to control unit 103. The control unit 1033 then sends a RELEASE message 1008 and terminal 106 sends RELEASE COMPLETE message 1009. The control unit 10333 thereupon releases facility 113.

Figure 2:
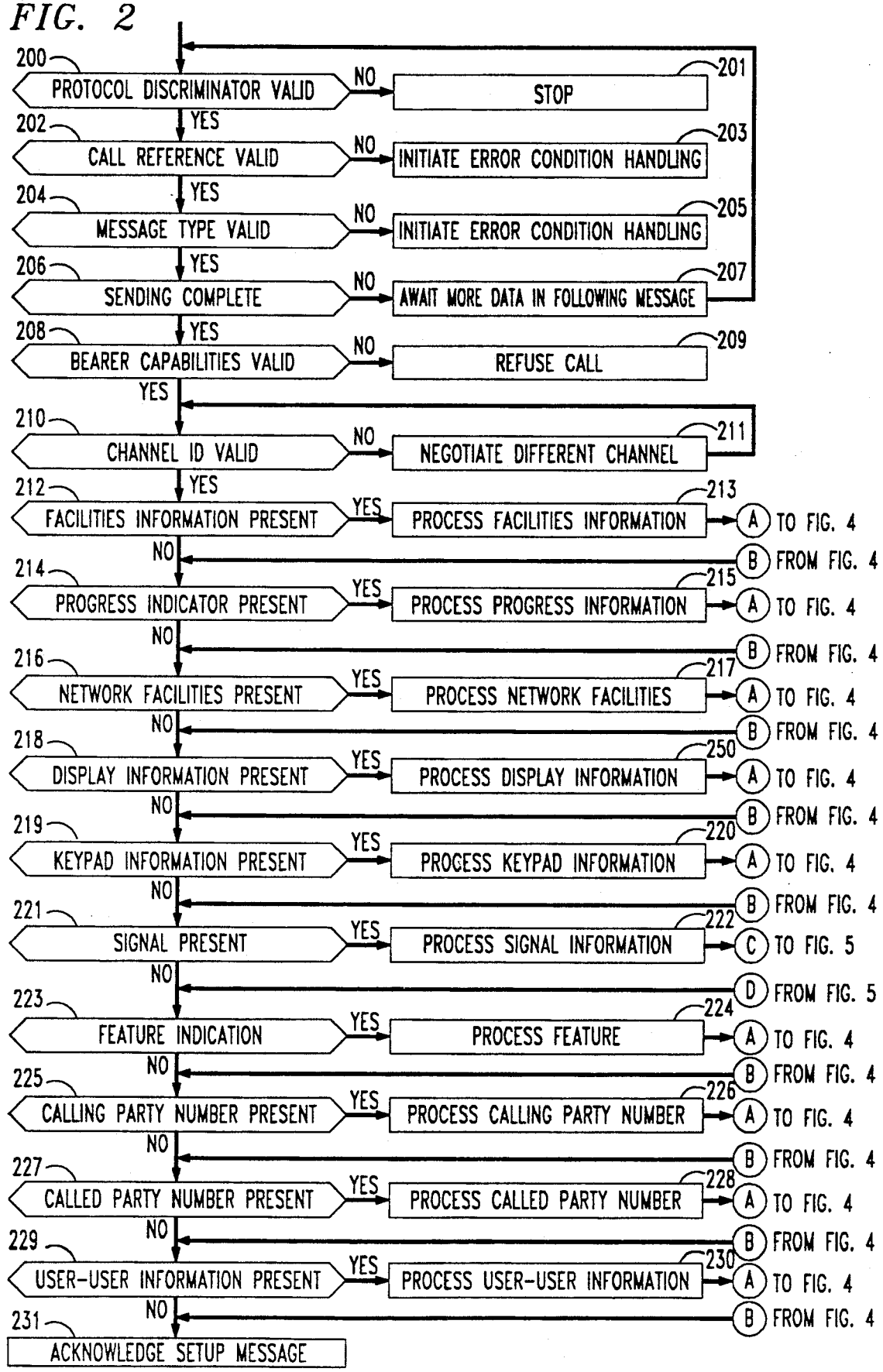
FIG. 2 is a flow chart describing the operation of the control unit of the system in response to Q.931 protocol communications.

The following description of call processing at control unit 103 makes joint reference to FIGS. 1, 2 and 3. In step 200, which depicts control unit 103 processing a message received from CO 100, control unit 103 validates the Protocol Discriminator element 301 and does not process SETUP message 101 unless the Protocol Discriminator element 301 indicates a Q.931 message.

If the Protocol Discriminator element 301 received by the control unit is not Q.931, the control unit 103 may broadcast the entire message to all terminals on the bus 113, as indicated by the DN 610. Q.931/NT2 terminals will check the discriminator and not process the message since the discriminator is not appropriate. Terminals, e.g.X.25 108, that recognize the discriminator will operate properly. X.25 is an octet-oriented protocol, with a structure similar to the Q.931 protocol. However, it has a different protocol discriminator element (301) than Q.931. Therefore, X.25 devices can be supported by an NT2 control unit simply by transparently passing those messages with the X.25 discriminator to the terminals. Note that the NT2 terminal message processing algorithm will detect that an X.25 message is not an NT2 message, and take no action, thus allowing the X.25 terminal to operate properly on the same bus as a Q.931 or NT2 terminal. If the protocol discriminator element 301 is valid, then in step 202, the Call Reference element 302 is validated against currently-assigned references. If it is acceptable, processing continues. Otherwise, in step 203, an error message is sent to CO 100. In step 204, the Message Type element 303, is then processed to determine if the message is appropriate to the current state of the call control state machine. If appropriate, the processing continues; else an error message is declared back to CO 100 at step 205. In step 206, control unit 103 checks if CO 100 has, optionally, included a Sending Complete element 304 in the Q.931 message to indicate that all information needed to complete the call is present. Otherwise, in step 207, control unit 103 awaits further information. In step 208, the Bearer Capabilities information element 306 is decoded to determine if the designated terminal, the terminal associated with call reference element 302, is capable of supporting the call type declared in element 306: if not, in step 209, the call is refused. Note that speech, e.g., terminal 106, or data, e.g., G4 fax machine 107, service is declared in Bearer Capabilities information element 306. If data is asserted, then the High Layer and/or Low Layer Compatibility Information elements must be processed to determine the data coding format. This is used by the G4 Fax machine 107 to perform compatibility checking. The G4 Fax machine 107 is supported on the NT2 links by virtue of the fact that the control unit 103 passes through the Bearer Capabilities, Low Layer Compatibility, and High Layer Compatibility elements on the NT2 station facility or bus 311. These elements are all that are required for channel service and endpoint decoding of the bearer channel contents. Thus, a G4 Fax, or any generalized data device, can be supported by the control unit 103. Note that, if terminal 106 includes a data capability, standard compatibility checking is performed and the data service initiated as appropriate. Thus, the terminal would then look at the bearer capabilities, high layer and low layer compatibility and determine if the call is a data or voice call.

In step 210, control unit 103 then checks the designated terminal channel use record to see if the channel declared in the Channel Identification element 307 is acceptable; if not, in step 211, control unit 103 establishes a channel negotiation process with CO 100. In step 212, an optional Facilities element 308 is checked and, if present, in step 212, the requested functional supplementary services are invoked. Otherwise, in step 214, an optional Progress Indicator element 309 is checked and, if present, processed in step 215. In step 216, optional Network Specific Facilities element 10 declaration is checked and, if present, processed in step 217. In step 218, if Display Information element 311 is contained in the SETUP message 101, then control unit 103 evaluates whether or not to display the information at the designated terminal, and if so, processes the display information in step 250, to select the display area and to send the information to the designated terminal for display as part of a Codeset 6 display message 381. In step 219, if the Keypad Information 312 is contained in the SETUP message 101, then in step 220, control unit 103 processes it, as appropriate to the context. In step 221, if Signal Information element 313 is present in the SETUP message 101, then in step 222 control unit 103 processes it as part of a Codeset 6 Audible Alert Control message 382. In step 223, control unit 103 evaluates the Feature Indication element 314 and, if present, processes the data for inclusion in Codeset 6 LED control message 383.

In step 225, control unit 103 decodes the optional Calling Party Number element 315 and Subaddress element 316 and, if present, then, in step 228, inserts them as part of display message 381. Display message 381, as later described, enables a terminal to display the number of the caller or to relay the number to an application processor. In step 227, control unit 103 evaluates the optional Called Party Number element 317 and, if present, in step 228, inserts it as part of the LED message 383 and display message 381. This LED display message 383, as later described, enables the receiving terminal, e.g., 105, to determine if it is the terminal being called by the far-end caller. Using this Called Party Number element 317, control unit 103 can accept the call, and select the call appearance associated with the Called Party Number 317 as declared in message 101. If the Called Party Number element 317 is not valid, the call may be refused by control unit 103. Note, that this requires that control unit 103 have knowledge of the directory number(s) (Called Party Number on an incoming call) for each terminal connected to it. Table 600 of FIG. 6 provides such information. In step 229, if the User Information Element 229 is present, control unit 103 includes it in display message 381 which is sent to the user in step 230. If all checks are passed, then control unit 103 transfers an affirmative response, in step 231, to the caller via CO 100; otherwise, a negative response is returned in step 231.

If a positive acknowledgment in step 231 is returned by control unit 103 to central office 100, then control unit 103 proceeds to process the received information. As previously noted above, the receipt of Q.931 protocol information may include information used for terminal displays, including the Facility Information 308, Progress Indicator 309, Network Specific Facilities 310, Display Information 311, Feature Indication 314, Calling Party Number 315 and Subaddress 316, Called Party Number 317 and User-User Information 319. This information is then processed by the display management process routine shown in FIG. 4. Control unit 103 executes the display management routine of FIG. 4 to generate the display message to be sent to terminals 105 and 106.

Figure 4:
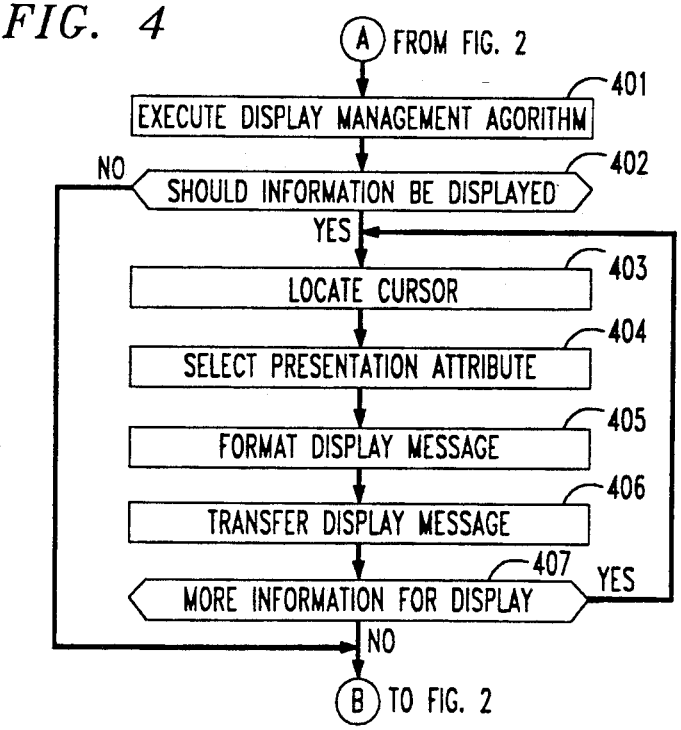
FIG. 4 is a flow chart describing the operation of a Display Management Routine executed in the control unit.

With reference to step 401 of FIG. 4, the display management algorithm is performed. The display management algorithm determines the priority (i.e., 402, placement (i.e., 403) and attributes (i.e., 404) of the displayable information on the terminal display device. In step 402, the process determines if the particular received information (e.g., Facility information 308) should be displayed at the terminal. If not, then Display process FIG. 4 returns control back to the main processing routine of FIG. 2. Assuming that the received information should be displayed, then in step 403 the cursor is located and in step 404 the presentation attribute is selected. The presentation attribute is selected by the control unit algorithm and includes presentations such as blinking, reverse video, etc. In step 405 the display message is formatted and in step 406 the display message is sent to the terminal. In step 407 it is determined whether more information is required to be sent. If so, control returns to step 402, otherwise control returns to the main processing routine of FIG. 2.

The receipt of Signal Information 313, in step 221, requires processing by the Alerter/LED routine shown in FIG. 5. The Signal Information may include the supervisory signaling information applicable to tones and alerting signals, ringing, etc. In step 501, the Alerter and LED activity algorithm is performed. This algorithm shows how the LED and Alerter conditions at the called terminal should be presented (e.g., flash LED, activate alerter). In step 502, the process determines if the terminal LED should be updated. If updating is required, then in step 503 the LED is located using the table of FIG. 6 and, in step 504, the appropriate flash pattern is selected according to the call state for that call appearance. If no LED updating is required or after LED updating is completed, process control moves to step 505 where it is determined if the terminal alerter condition should be updated. If so, then, in step 506, the alert pattern is selected according to the call state for that call appearance. If no alerter updating is required or after the alerter has been updated, process control moves to step 507 where it is determined whether an alerter/LED message should be sent to the terminal. If not, control returns to the main processor of FIG. 2, otherwise in step 508 the message is formatted. In step 509 the message is transferred to the called terminal and control returns to the main process of FIG. 2.

The above Alerter/LED processing of FIG. 5, required that control unit 103 utilize the terminal data table of FIG. 6 to select the button and LED pair 630 on the eligible terminals that represent the Called Party Number 317 declared in message 101. The Alerter/LED processing also generated the flash pattern for the LED and an appropriate alerting tone selected according to a stored algorithm. The control unit 103 transfers the display and Alerter/LED information to the target terminal(s) (105 and/or 106) using the NT2 SETUP message shown by 104 of FIG. 3 as described below.

In accordance with the present invention, after control unit 103 has received from CO 100 the information elements 301-321 of the Q.931 protocol SETUP message 101, it processes the information into a local NT2 protocol 104 for use in communications with terminals 105 and 106. The table 300 shown in FIG. 3 shows the mapping of the Q.931 protocol message 101 elements into our novel NT2 protocol message 104 elements. As illustrated, the NT2 protocol message 104 includes a first (mandatory per Q.931) segment 370 and a second (local code set) segment 380. Control unit 103 sends a mandatory subset of the basic call control information elements (i.e., elements 301, 302, 303, 306 and 307) as part of a first segment 370 of NT2 protocol message. Control unit 103 translates or processes the optional subset of the Q.931 protocol message 101 information elements (i.e., 311, 313, 314, 315, 316, 317 and 321) into a second segment 380, called local codeset or Codeset 6, of the NT2 protocol message 104. The Codeset 6 elements 381-383 are generated by control unit 103 as a result of user interface processing previously described in FIGS. 4 and 5. As shown in FIG. 3 the resulting NT2 protocol message 104 has a significantly-reduced information element set. The reduced information element set significantly reduces the amount and complexity of the processing required at each terminal connected to the system.

At the control unit 103 the user interface processing, which maps Q.931 information elements 311, 313, 314, 315, 316, 317 and 321 into Codeset 6 elements 381, 382 and 383, may be implemented using algorithmic mapping. This requires that control unit 103 maintain a data table which defines the relationship between directory numbers (DNs), column 610; system terminal, column 620; and button and LED call number at that terminal, column 630. In FIG. 6 each of the directory numbers, column 610, handled by the system may have an appearance at more than one terminal. [Note that the data in this table is also used for faster management, as discussed below]. For example, DN 957 0000 is shown to have an appearance at the terminals identified as 1, 2, 3 and 4. At terminal 1, the button and LED number 1 is, illustratively, associated with DN 957 0000 while terminal number 4, illustratively, associates button/LED number 3 with DN 957 0000. Note, obviously, that a unique button/LED is assigned to each DN appearance at a terminal.

The simplified NT2 protocol command set is supported within the limits of the Q.931 protocol standard through use of the Locking Shift information element and procedure to shift to a local Codeset 6. As the NT2 Setup Message Tabulation 104 of FIG. 3 shows, the information elements in this NT2 protocol message set are less in number and complexity than those in the Q.931 protocol message 101. Note that all mandatory information elements associated with basic Q.931 call control (301-303, 306) are supported by the NT2 protocol 104, but all others (311, 313-317, 321) are processed by control unit 103 and issued to the terminal as commands (381-383) used to generate tones, activate LEDs, and manage the display. The difference between our NT2 protocol approach and the standard Q.931 protocol is that within the communication system 102, the complicated evaluative algorithms need exist only at control unit 103, rather than at each terminal 105, 106 of the system 102.

Thus, control unit 103 processes Q.931 Message 101 as depicted in the flow chart of FIG. 2 and formats an NT2 SETUP message 104 for the target terminal(s), based on the results of the execution of its evaluative algorithms for both call and user interface control. The flow chart of FIG. 8, discussed below, describes the message exchange between control unit 103 and the terminals 105 and/or 106.

Terminal processing of the NT2 protocol message 104 received from control unit 103 is shown in FIG. 8. The step-by-step procedure is not repeated here but generally equivalent to that described above in FIG. 2. Thus, the terminal processing steps 800 through 805 are equivalent to the control unit 103 steps 200-205 previously described in FIG. 2 and the terminal processing steps 807-810 are equivalent to the control unit processing steps 208-210.

The user interface information contained in Codeset 6 is processed by the terminal in steps 811 through 816. In step 811 the LED control command, having content 701, is checked. If present, the terminal executes, in step 812, the command and appropriately selects and activates the LED. In step 813 the Alerter control command, having content 702, is checked. If present, the command is executed, in step 814, and the appropriate tone is outputted by the Alerter. In step 815 the display control command is checked. If present, the display command, having content 703, is executed, in step 816, and the appropriate text is outputted on the terminal display. In step 817, the terminal returns an acknowledgment to the SETUP message to control unit 103.

Note, if a user at a terminal 105 or 106 activates a line or feature button thereat, a button command 704 is sent to the control unit 103 to identify the button and its state. If a user goes on-hook or off-hook, then an appropriate supervision message is sent to the control unit as per Q.931. These button and supervision messages are sent as part of the Codeset 6 messages to the control unit 103 from the terminal, but including all mandatory components of Q.931.

Button ID's are used to identify Feature activation at the terminal in the same fashion as line selection. The terminal sends only a button ID command to the control unit 103, which uses the data in its administration table 600 (FIG. 6) to relate the button to a feature (e.g., hold feature is button 4 on terminal 1.) The control unit then executes the feature.

This provides a single method for the terminal to process both line selection and feature activation operations, again simplifying the terminal while preserving full functionality for the user.

When a network service was indicated to control unit 103 by a terminal button depression, control unit 103 has the necessary information to translate that into a network message. This is based on the administration data available to the control unit which relates buttons to lines of features/services. When control unit determines that a network service is being requested, e.g., the user wishes to place a call, the control unit performs the obverse of the Q.931 to NT2 information element mapping described in FIG. 3. The mandatory elements are passed transparently to the network. The control unit can relate the line selected to a Directory Number as follows: when a user on a terminal depresses a button and the terminal advises the control unit of this event, the control unit knows which terminal sent the message, and from its administration data, which Directory Number is associated with a given Button ID. This allows the control unit to provide the assigned Directory Number to the network during call setup. Standard channel selection procedures are effected in the same manner as in the down link direction, and the message is transferred to the network. Note that all mandatory and some optional information elements are thus supplied to the network from the control unit.

While the present invention has been described as applicable to the Q.931 protocol used with ISDN signaling, it is contemplated that the present invention can be readily adapted in a straightforward manner for use with other protocols which are similarly structured, e.g., Q.931 derivative protocols. Thus, the present invention can be utilized to supplement communication protocols which include a group of elements to control channel acquisition and a second group which provides additional information utilized by the device connected to the signaling channel.

What has been disclosed is merely illustrative of the present invention. Other arrangements and methods can be implemented by those skilled in the art without departing from the spirit and scope of the present invention.

We claim:

1. A communication system arranged to receive ISDN D channel information in a Q.931 protocol message over a first communication channel, said system including a control unit connected to said first channel and connected over a communication facility, including one or more second communication channels, to at least one station terminal, said system further including
at said control unit
means for converting a received Q.931 protocol message which controls call connections over said first channel using said D channel information, into a local protocol message for controlling communications with said at least one station terminal over said facility on a per second channel basis, said local protocol message controlling said at least one station terminal, said local protocol message including
a first group of information elements containing mandatory Q.931 protocol message information elements and
a second group of information elements derived from a third group of information elements selected from one or more sets of information elements including 1) a first set of non-mandatory Q.931 protocol message information elements, and, 2) a second set of local information elements obtained from a data memory accessible by said control unit and
at said at least one station terminal
means for receiving said local protocol message and for controlling a calling state of at least one second channel of said at least one station terminal.

2. The system of claim 1 wherein said local protocol message identifies calls on a bearer channel connection basis.

3. The system of claim 1 wherein the local protocol message enables said at least one terminal to manage line selection and feature invocation by sending button identification signals in said local protocol message sent to said control unit.

4. The system of claim 1 wherein said facility is a multipoint passive bus and wherein said first group of information elements includes the mandatory elements of said Q.931 protocol message for supporting Q.931 compatible devices that require a connection on said multipoint passive bus.

5. The system of claim 1 wherein said facility includes a separate point-to-point facility to connect to each of said at least one station terminal to said control unit.

6. The system of claim 1 wherein said at least one station terminal includes means responsive to said first group of information elements for establishing a call connection between said control unit and said at least one station terminal.

7. The system of claim 1 wherein the user-interface device is an LED device.

8. The system of claim 1 wherein the user-interface device is a display device.

9. The system of claim 1 wherein the user-interface device is an alerting device.

10. The system of claim 1 wherein said local protocol message enables a Q.931 compatible terminal connected over a facility to said control unit to establish a communication connection therewith.

11. The system of claim 1 further including
a second station terminal connected over said facility to said control unit, said second terminal communicating with said control unit using Q.931 protocol messages, and
said control unit further including
means for determining terminal type from a terminal data table and for communicating said Q.931 protocol messages over said facility when said second terminal is determined to be a Q.931 terminal type.

12. A station terminal arranged to communicate ISDN D channel control information in a Q.931 control protocol message over a communication facility to a control unit, said terminal comprising means for receiving information over said facility from said control unit, said information being received in a local protocol message format having a first group of information elements including a first group of control information elements containing mandatory elements of said Q.931 protocol messages for controlling a call setup at station terminal and a second group of control information elements derived from a third group of information elements selected from one or more sets of information elements including 1) a first set of non-mandatory Q.931 protocol message information elements, and, 2) a second set of local information elements obtained from a data memory accessible by said control unit and means for controlling user interactions with said terminal, via said user-interface device, using said second group of control information elements.

13. The station terminal of claim 12 wherein said local protocol message identifies calls on a bearer channel connection basis.

14. The station terminal of claim 12 wherein said second group of control information elements enables said terminal to manage line selection and feature invocation by sending button identification signals in a local protocol message received from said facility.

15. The station terminal of claim 12 wherein the user-interface device is an LED device.

16. The station terminal of claim 12 wherein the user-interface device is a display device.

17. The station terminal of claim 12 wherein the user-interface device is an alerting device.

18. A control unit for use in a communication system including at least one station terminal connected over a communication facility to said control unit, said control unit also connected to an external communication channel, said control unit comprising means for receiving ISDN D channel call control information in a Q.931 control protocol message over said external communication channel, means for converting a received Q.931 control protocol message which controls call connections over said first channel using said D channel information, into a local protocol message for controlling communications with said at least one station terminal over said facility on a per second channel basis, said local protocol message controlling said at least one station terminal, said local protocol message including a first group of information elements containing mandatory Q.931 protocol message information elements for establishing a call connection between said control unit and said at least one station terminal and a second group of information elements derived from a third group of information elements selected from one or more sets of information elements including 1) a first set of non-mandatory Q.931 protocol message information elements, and 2) a second set of local information elements obtained from a data memory accessible by said control unit and means for sending said local protocol message over said facility to said at least one station terminal.

19. A control unit of claim 18 wherein said local protocol message identifies calls on a bearer channel connection basis.

20. The control unit of claim 18 wherein the local protocol message enables said control unit to manage line selection and feature invocation by receiving button identification signals in a local protocol message received over said facility.

21. A control unit of claim 18 further including means for determining terminal type from a terminal data table and for communicating said Q.931 protocol messages over said facility when said terminal is determined to be a Q.931 terminal.

22. A method of operating a communication system arranged to receive ISDN D channel information in a Q.931 protocol message over a first communication channel, said system including a control unit connected to said first channel and connected over a communication facility, including one or more second communication channels, to at least one station terminal, said method comprising the steps of at said control unit converting a received Q.931 protocol message which controls call connections over said first channel using said D channel information, into a local protocol message, controlling communication with said at least one station terminal, over said facility on a per second channel basis, said local protocol message controlling said at least one station terminal, said local protocol message including a first group of information elements containing mandatory Q.931 protocol message information elements and a second group of information elements derived from a third group of information elements selected from one or more sets of information elements including 1) a first set of non-mandatory Q.931 protocol message information elements and 2) a second set of local information elements obtained from a data memory accessible by said control unit, and at said at least one station terminal controlling a calling state of at least one second channel of said at least one station terminal.

23. A method of operating a station terminal arranged to communicate ISDN D channel control information in a Q.931 control protocol message over a communication facility to a control unit, said method comprising the steps of receiving information over said facility from said control unit, said information being received in a local protocol message format having a first group of information elements including a first group of control information elements containing mandatory elements of said Q.931 protocol messages for controlling a call setup at said station terminal and a second group of control information elements derived from a third group of information elements selected from one or more sets of information elements including 1) a first set of non-mandatory Q.931 protocol message information elements, and, 2) a second set of local information elements obtained from a data memory accessible by said control unit and controlling user interactions with said terminal, via said user-interface device, using said second group of control information elements.

24. A method of operating a control unit for use in a communication system including at least one station terminal connected over a communication facility to said control unit, said control unit also connected to an external communication channel, said method comprising the steps of receiving ISDN D channel call control information in a Q.931 control protocol message over said external communication channel, converting a received Q.931 control protocol message which controls call connections over said first channel using said D channel information, into a local protocol message for controlling communications with said at least one station terminal over said facility on a per second channel basis, said local protocol message controlling said at least one station terminal, said local protocol message including a first group of information elements containing mandatory Q.931 protocol message information elements for controlling a call setup at said at least one station terminal and a second group of information elements derived from a third group of information elements selected from one or more sets of information elements including 1) a first set of non-mandatory Q.931 protocol message information elements, and, 2) a second set of local information elements obtained from a data memory accessible by said control unit and sending said local protocol message over said channel to said at least one station terminal.

25. A communication system arranged to receive ISDN D channel information in a Q.931 protocol message over a first communication channel, said system including a control unit connected to said first channel and connected over a communication facility, including one or more second communication channels, to at least one station terminal, said system further including at said control unit means for converting a received Q.931 protocol message, which controls call connections over said first channel using said D channel information, into a local protocol message for controlling communications with said at least one station terminal over said facility, on a per second channel basis, said local protocol message controlling said at least one station terminal, said local protocol message including a first group of information elements containing mandatory Q.931 protocol message information elements and a second group of information elements derived from 1) non-mandatory Q.931 protocol message information elements and 2) local information elements obtained from a data memory accessible by said control unit and at said at least one station terminal means for receiving said local protocol message and for controlling a calling state of at least one second channel of said at least one station terminal.

26. A method of operating a communication system arranged to receive ISDN D channel information in a Q.931 protocol message over a first communication channel, said system including a control unit connected to said first channel and connected over a communication facility, including one or more second communication channels, to at least one station terminal, said method including the steps of at said control unit converting a received Q.931 protocol message, which controls call connections over said first channel using said D channel information, into a local protocol message, controlling communications with said at least one station terminal over said facility, on a per second channel basis, said local protocol message controlling said at least one station terminal, said local protocol message including a first group of information elements containing mandatory Q.931 protocol message information elements and a second group of information elements derived from 1) non-mandatory Q.931 protocol message information elements and 2) local information elements obtained from a data memory accessible by said control unit and at said at least one station terminal receiving said local protocol message and for controlling a calling state of at least one second channel of said at least one station terminal.

* * * * *